March 4, 1969
C. A. NYSTROM
3,430,811
PNEUMATIC CHIP EJECTOR
Filed Dec. 18, 1967
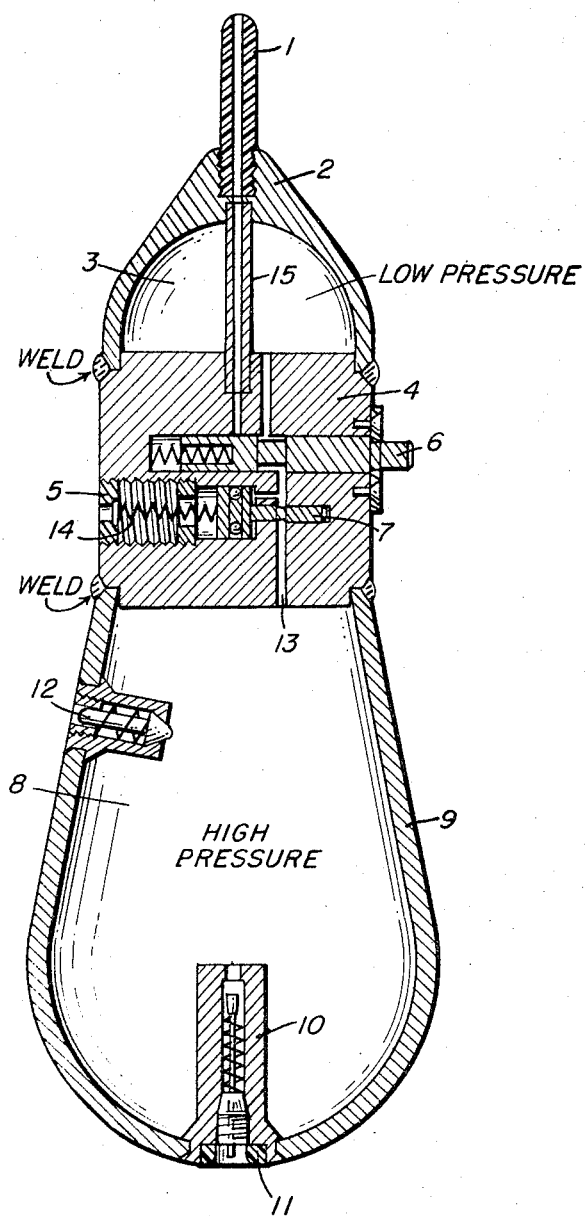
INVENTOR.
CHARLES A. NYSTROM : 3,430,811
: Patented Mar. 4, 1969

3,430,811
PNEUMATIC CHIP EJECTOR
Charles A. Nystrom, 31 Alps Road, Wayne, N.J. 07470
Filed Dec. 18, 1967, Ser. No. 696,679
U.S. Cl. 222—3
Int. Cl. B08b 5/02
4 Claims

ABSTRACT OF THE DISCLOSURE

A hand held air ejector including a high pressure air reservoir, a regulating valve, a low pressure chamber, a control valve and a nozzle. The regulating valve supplies air from the high pressure reservoir to the low pressure chamber at a safe, reduced pressure. The control valve disconnects the high pressure reservoir from the chamber, and simultaneously connects the low pressure chamber to the nozzle to produce a safe, low pressure pulse or puff from the nozzle, said pulse being useful to eject metal chips from machined parts.

---

The present methods of ejecting chips from machined parts set up on such machines as millers and grinders are either an air hose connected with an air compressor, a bulb syringe, or a brush. The air hose is unsatisfactory and hazardous to the operator and his co-workers, and damaging to the movable parts of the machine due to its high pressure blowing dirt into these parts. The bulb syringe is safe but difficult to aim often requiring two hands to operate.

My invention is safe, due to its low pressure and is easily held, aimed and operated with one hand by light pressure of a button. It reserves its own air at high pressure which is released at a low variable pressure. Its high pressure chamber is filled by any air hose typical in all manufacturing companies and machine shops.

Other advantages of this invention will become apparent from the following description given in reference with the accompanying cross sectional drawing.

In observing the accompanying cross sectional drawing it will be noted that there is both high pressure 8 and low pressure 3 chambers. The low pressure chamber is fitted with a plastic nozzle 1 which is threaded into the low pressure chamber 2. This chamber holds approximately one cubic inch. This chamber is fitted to the valve body 4. The high pressure chamber 9 is fitted to the opposite end of the valve body, and both chambers are heliarc welded to the valve body. Both chambers must be capable of containing 150 pounds of air safely. The two chambers and the valve body are to be made of aluminum. The low pressure chamber and the valve body can be machined productively while the high pressure chamber can be deep drawn to shape to contain a volume of 10 cubic inches. A commercial safety valve 12 is fitted thru the wall of the high pressure chamber by swaging. An adaptor 10 for a commercial tire valve is made of aluminum and swaged in place. A plastic washer 11 is pressed in this adaptor having a belled opening to suit an air nozzle. The will be a $\frac{1}{16}$ inch diameter passage 13 from the high pressure chamber to the low pressure chamber. The valve body is fitted with a regulator 7 held in by a spring 14. An on-off manually operated valve 6 is installed in the valve body. Aluminum tubing 15 pressed between the valve body and the low pressure chamber completes the pasage to the nozzle.

The manner in which this air ejector works is as follows: An air nozzle is held against plastic washer 11 filling the high pressure chamber. The air then follows thru passage 13 circumventing valve 6 and enters the low pressure chamber as the air builds up to a determined low pressure it forces the regulator 7 against the spring and shuts off the high pressure chamber from the low pressure chamber. When the on-off valve is activated it seals the high pressure chamber but allows the low pressure air to pass thru the tubing 15 and to exit thru nozzle 1.

I claim:
1. A pneumatic, hand held chip ejector comprising a high pressure chamber, a low pressure chamber, a passageway connecting said chambers, a blowing nozzle, a pressure regulating valve in said passageway for delivering a constant low pressure from said high pressure chamber to said low pressure chamber, and valve means to close said passage and to connect said nozzle to said low pressure chamber when activated and vice versa when non-activated.

2. The ejector of claim 1 wherein said valve means is a single element operating in a bore.

3. The ejector of claim 2, wherein said element is between said chambers, has a projecting portion engageable by the finger of the operator, and has a means to bias said element to said non activated position.

4. The ejector of claim 1 wherein there is a means on said high pressure chamber to refill same from an external source of high pressure gas.

References Cited

UNITED STATES PATENTS

| | | | |
|---|---|---|---|
| 1,959,815 | 5/1934 | Corcoran | 222—3 X |
| 2,021,603 | 11/1935 | Kelley et al. | 15—405 X |
| 2,695,731 | 11/1954 | Anderson | 222—3 |

ROBERT B. REEVES, *Primary Examiner.*

H. S. LANE, *Assistant Examiner.*

U.S. Cl. X.R.

15—405